March 22, 1955 J. H. HAMMOND, JR 2,704,784

TELEVISION IMAGE RECORDER AND CONTROL SYSTEM

Filed Nov. 29, 1949 2 Sheets-Sheet 1

Inventor
JOHN HAYS HAMMOND, JR.

By

Attorney

March 22, 1955 J. H. HAMMOND, JR 2,704,784

TELEVISION IMAGE RECORDER AND CONTROL SYSTEM

Filed Nov. 29, 1949 2 Sheets-Sheet 2

Inventor
JOHN HAYS HAMMOND, JR.
By
Attorney 2,704,784

Patented Mar. 22, 1955

2,704,784

TELEVISION IMAGE RECORDER AND CONTROL SYSTEM

John Hays Hammond, Jr., Gloucester, Mass.

Application November 29, 1949, Serial No. 129,951

6 Claims. (Cl. 178—7.4)

Figure 1:
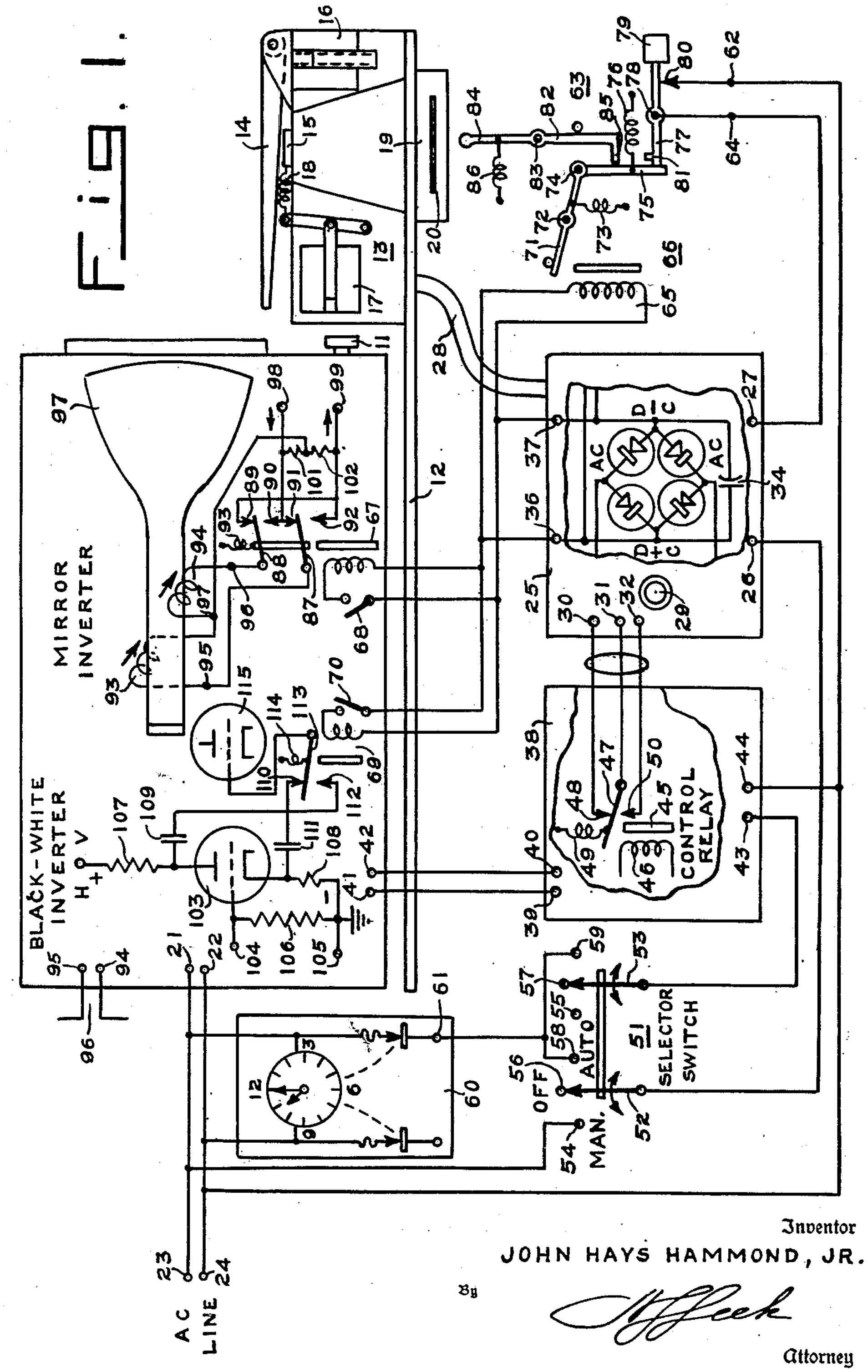

This invention relates to television recording systems including a television screen and photographic mechanism to make a photographic image of the screen as described more in detail in the copending application of Ellison S. Purington and John Hays Hammond, Jr., Serial No. 124,419, filed October 29, 1949, and aims to provide improved control and actuating means for making the photographic record.

More specifically the present invention relates to a coordinated arrangement by which the kinescope of a television receiver may be used effectively for its usual purpose with visual observation, but may also be used when the information on its screen is to be recorded in a simple photographic manner; either with local manual control of the photographic triggering to obtain a picture freely chosen by the receiver operator, or with forced remote automatic control by transmitted signals to obtain a special picture chosen and set up for automatic recordable transmission at the transmitter.

Thus for example in the interest of convenience and simplicity, the photographic system may use a reflecting mirror between the kinescope screen and the photographic recorder shutter, and it may provide that the finished record be merely the photographic negative of the information on the screen during the recording period. The invention provides that the finished record will nevertheless not be the mirrored image, nor the negative of the desired information. It provides that prior to and for the duration of the recording, the video signal impressed on the kinescope can be sense reversed, and the sweep current in one of the magnetic beam deflecting coils of the kinescope can also be sense reversed, thereby compensating for later optical-photographic reversals in the recorder device. But the invention further provides that such reversal of the kinescope operation, although necessary for local recording, need not be practiced when with remote control the reversal has been made in the scanning or in the amplification of the special picture.

Another aim or object is to provide a system of the above type in which the photographic record may be made in response to a received signal, at predetermined times, or in response to a local control mechanism.

Another object is to provide a system of the above type in which the various controls are separately powerized and controlled.

Another object is to provide image inversion means to compensate for any inversion which may be inherent in the particular photographic recording systems used.

Various other objects and advantages will be apparent from the following description taken in connection with the accompanying drawings in which specific embodiments have been set forth for purposes of illustration.

Figure 2:
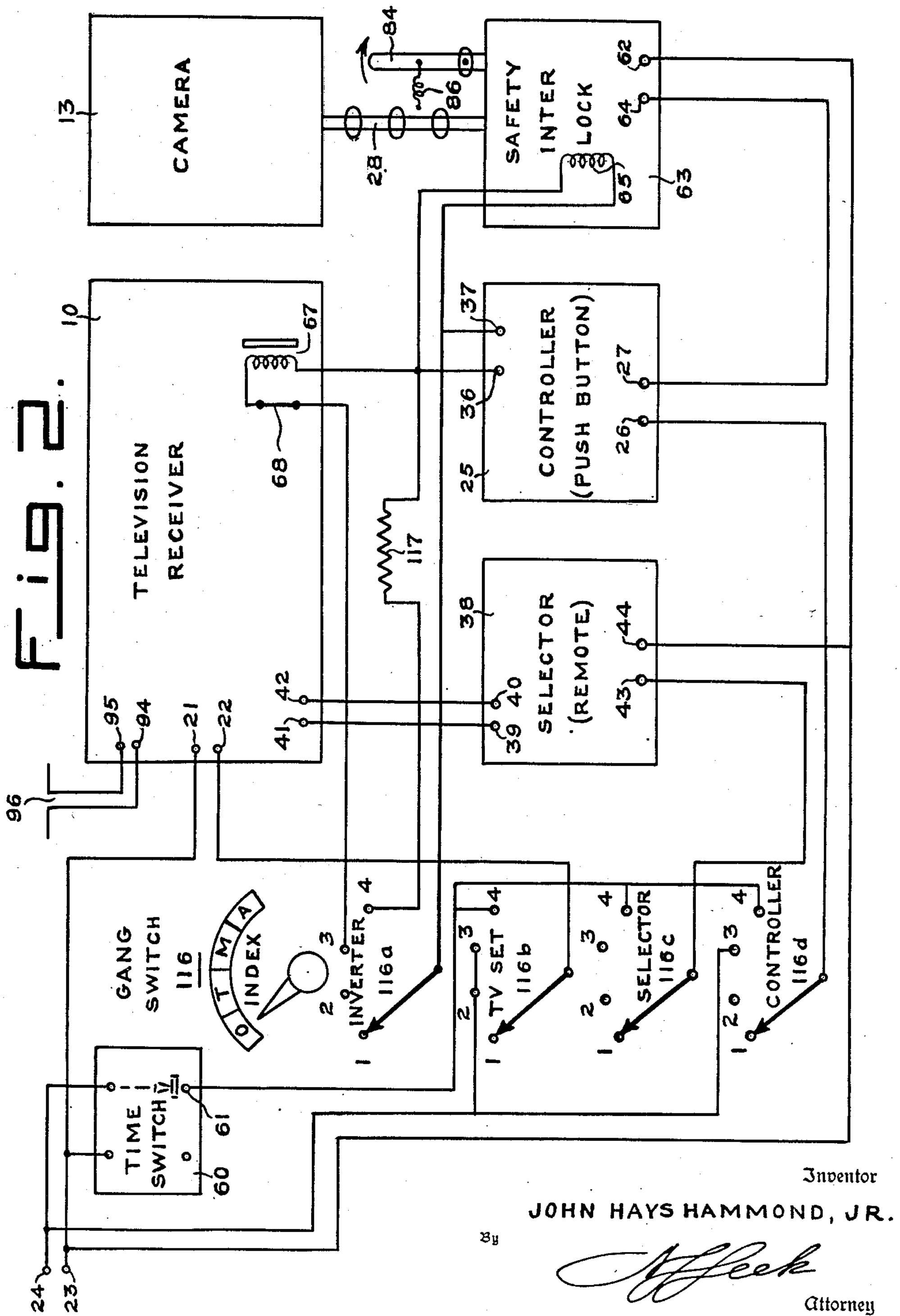

In the drawings:

Fig. 1 is a schematic diagram illustrating a control system embodying the present invention, and Fig. 2 is a similar schematic diagram illustrating a modified form of the invention.

In the following description parts will be identified by specific names for convenience, but they are intended to be generic in their application to similar parts.

In Fig. 1, a television receiver 10 provided with a power switch 11 is mounted on a table top 12 and a special camera 13 provided with a movable mirrored lid 14, a shutter-lens system 15, a lifter solenoid 16, a shutter solenoid 17, a coupling 18 and a photo-chemical recorder 19, is so positioned in front of the screen of the television receiver that when the lid 14 is raised by the solenoid 16 and the shutter is snapped by the solenoid 17, a virtual image is produced in the recorder 19. In the recorder is a recording medium such as a photographic film which is advanced manually or otherwise before the next exposure is made, and this medium may have the form of a sheet 20 which is to be pulled out prior to or after the application of developing reagents. The television receiver has power input terminals 21, 22 which are permanently connected to the power line 23, 24, it being noted that in this figure, the switch 11 controls the functioning of this part of the system.

For operating the camera 13, a controller 25 is provided with A. C. input terminals 26, 27, and a multiconductor cable 28 connected to the camera 13, by which said camera is made to function to take a picture upon depressing a push button 29 provided terminals 26, 27 are powerized. This controller is provided with three terminals 30, 31, 32 so interconnected with the manual push button 29 that the camera may be made to function also by a distant push button or relay. The terminal 31 must be connected externally to terminal 30 to permit the push button 29 to function. In place of pushing the button however, similar results may be achieved by breaking the external connection from terminal 31 to terminal 30 and making an external connection from terminal 31 to terminal 32. Within the controller 25 may be a rectifier or other A. C.-D. C. converter, 33, with output filter capacitor 34 which functions to produce D. C. operating voltage for the camera 13 only while the camera is desired to be operated. Additional terminals 36 and 37 are provided in parallel with the capacitor 34 to powerize certain circuits to be described.

For remote operation by an audio signal over the television channel, a selective relay operating circuit 38 is provided, with input terminals 39, 40, connected to output terminals 41, 42 of the audio system of the television receiver 10, and with power terminals 43, 44. The circuit 38 is functionally terminated with a relay 45 with winding 46, armature 47 normally held against a back contact 48 by a spring 49, and a front contact 50. The contact 48, armature 47 and contact 50 are connected to terminals 30, 31, 32 of the controller 25 respectively so that the controller functions by throw of the armature 47 in response to current in the winding 46 similar to its functioning by depressing the push button 29.

For controlling the power supply to the controller 25 and the selector 38, a double pole triple throw selector switch 51 with "manual," "off" and "automatic" positions is provided with movable blades 52, 53 with contacts 54 to 59 inclusive. This provides for "manual" or "automatic" supply of power to operate the devices of relay circuit 38 and controller 25. To the power line terminals 23, 24 is connected a time switch 60 which is continuously operating and arranged to connect line terminal 23 to output terminal 61 during suitable times, such as from three minutes before to one minute after a scheduled transmission accompanied by the tonal signal to actuate the camera. Terminal 61 is connected to switch contacts 58 and 59 and the power terminal 23 is connected to contact 54, and terminals 56, 55 and 57 are not used. The movable blade 52 which may be connected to either contact 54, 56 or 58 is connected to terminal 26 of the controller 25. The movable blade 53 will follow the motion of blade 52 and will be connected to a contact bearing a number one integer greater than the number of the contact to which blade 52 is connected. The blade 53 is connected to terminal 43 of the selector 38. The other power terminal 24 is connected to selector terminal 44 and to a terminal 62 of a safety interlock device 63, the other terminal 64 of which is connected to controller terminal 27.

Thus the connections are such that the controller 25 cannot receive power at terminals 26, 27 for operating the camera 13 when button 29 is depressed or relay 45 is actuated, unless connections are provided between terminals 62 and 64 by the interlock 63. When this is provided, the controller terminals 26, 27 will be powerized whenever the selector switch 51 is thrown from center to the left position for "manual" operation by push button 29. When the selector switch 51 is thrown from center to the right position to provide for "automatic" operation by an audio control signal impressed upon the control terminals 39, 40 of circuit 38, and the time switch operates to connect A. C. line terminal 23 to selector switch terminals 58, 59, then the circuit 38 will be powerized at terminals 43, 44, and the circuit 25 will also be powerized at terminals 26, 27 if the interlock connection is made. Subsequent to the powerization of circuit 25 only for manual operation the camera may be operated by depressing button 29; subsequent to powerization of both circuit 25 and circuit 38, the camera may be operated by the audio signal impressed upon terminals 39, 40 of circuit 38.

The terminals 36, 37 of the controller are powerized only when current is being applied to elevate the mirror lid 14 or to hold it elevated. Power drawn from these terminals during the operation of the camera is available for three purposes; firstly to set the interlock so that terminals 62 and 64 will be disconnected at the end of the lifting operation and remain disconnected until the interlock is manually reset by advancing the camera to make possible another exposure; secondly to make any desired mirror inversion of the picture on the screen of the television receiver 10 during the camera operation and thirdly to make any desired light inversion from black to white and vice versa, during the camera operation. For these purposes the terminals 36, 37 are connected to the winding 65 of an interlock actuator 66; to the winding of a reversing relay 67 provided with a switch 68 in one lead, and to the winding of a reversing relay 69 provided with a switch 70 in one lead.

The interlock actuator 66 is provided with an armature 71 pivoted at 72 and normally held away from the coil of the actuator by a spring 73. To the end of the armature away from the coil is hinged at 74 a vertical bar 75 with a spring 76, which holds the bar 75 against the end of a conducting bar 77 pivoted at 78 and provided with a counter-weight 79. Terminal 64 is connected to switch bar 77, and terminal 62 is connected to a contact 80 which contacts the bar 77 whenever it is free to rotate under the action of the counterweight 79. Near the end of the bar 77 is a raised stop 81. When the winding 65 is actuated, operating the armature 71, the vertical member 75 is lifted so that its lower extremity is above the end of the bar 77, and the spring 76 pulls the arm 75 to the right against the stop 81. During this action, the connection continues between contact 80 and the arm 77, thereby continuing the powerizing of controller 25. When however during operation the voltage across terminals 36, 37 ceases due to release of the push button 29 or of the relay 45, then the spring 73 restores the armature 71 to the normal position shown, but the lower part of arm 75 presses on the end of the switch bar 77 to rotate it counterclockwise thereby breaking the contact connection from contact 80 to bar 77 so that the controller 25 cannot be again powerized until the interlock switch has been restored to the normal condition depicted. For this purpose a lever bar 82 pivoted at 83 with a handle 84 and foot 85 is so placed that the handle must be thrown back to the right in order to advance the recording medium or film in recorder 19 in order to make ready a new recording surface. As this handle is moved, the foot 85 presses the arm 75 away from the stop 81 and out of the path of the bar 77, which is now free to rotate clockwise, which it does, thereby restoring the switch bar to normal position indicated. Upon release of the handle 84, a spring 86 restores the lever 82 to normal. Thereupon the interlock permits a subsequent operation of the camera. In this manner double exposure on a recording surface is prevented since the reset of the interlock requires the substitution of a new recording surface.

Relay switch 67 provides for a reversal of the current pattern in one of the sets of deflection coils of the kinescope of the television receiver during the interval when the camera is operative. Thus the normal connection may or may not be such that the developed record or picture may be the mirror image of the object as viewed on the screen. For special programs when the automatic control is utilized, the picture may be of course reversed at the transmitter if desired to make it appear correct when developed. If this is the case, then there is a need for producing a mirror image by the reversal of the picture during recording of regular programs which are not pre-reversed. If however, for example, the picture is made directly on a negative then the picture will correspond to what is on the kinescope screen because of the reversing effect of the mirror associated with lid 14, so that there need be no pre-reversal of the special transmitted picture and no compensating reversal for other program material. Therefore the switch 68 is provided as an optional connection, and it is to be understood that the arrangement may be such that switch 68 is closed for regular pictures and open for transmitted picture, or vice versa. But whenever the switch 68 is closed so that relay 67 is actuated while the camera 13 is powerized then during the camera operation the picture on the screen as viewed from the front is the mirror image of what it would be if the switch 68 were open.

The relay 67 is provided with double pole double throw moving system, connected for current reversal operation. Thus it has two arms 87, 88 and four contacts 89, 90, 91, 92, and a spring 93 by which arm 88 is normally held to contact 89, and arm 87 to contact 91. When the relay winding is energized due to the development of a D. C. voltage at terminals 36 and 37, the switch 68 being closed, the arm 88 becomes connected to contact 90 and arm 87 is connected to contact 92.

The television receiver 10 is provided with signal input terminals 94 and 95 connected to an antenna 96 whereby it functions to produce an audio output at terminals 41, 42 and a video output in two dimensions on the screen of a kinescope 97. The kinescope is provided with two pairs of deflection coils, of which one set is shown, designated 93, 94, with outer terminals 95, 96, and a common center terminal 97. Current for the coils is supplied through terminals 98 and 99 from a source not shown. When as here indicated, the coils are for producing vertical electronic deflection the coils are often shunted by resistors such as 100 and 101, with one end of each connected to different terminals, and the other ends connected together and to the common terminal 97 of the deflection coils. Coil terminals 95 and 96 are connected to relay switch arms 87 and 88 respectively, source terminal 98 is connected to front contact 90 and back contact 91, while source terminal 99 is connected to front contact 92 and back contact 89. The connections are such that a normal picture is produced on the kinescope screen when the relay is in the normal condition, but when the relay is thrown, the connections are such that the picture on the screen is a mirror image of the normal picture. If a correct final picture is produced by reversal of the current in the vertical deflection coils, then it also would be produced with 180 degree rotation of the picture if the current in the horizontal deflection coils had been reversed. Accordingly, either sets of coils may be connected for reversal in practice, although the use of the vertical deflection coils in some respect is preferable. It will be understood that the relay 67 may be so placed, or the winding may be put in series with an electromagnet so placed that there is also a reversal of the extraneous deflecting field, due in part for example to a loud speaker near the kinescope, so that the picture on the screen is not altered upon reversal of the current wave form in the coils except as to the production of a mirror image.

The mirror inversion by relay 67 may be required to compensate for the mirror inversion by the mirror lid 14, provided the recording uses a photographic negative which transfers the picture to a positive by a contact process. It will not be needed if the picture which is viewed is that developed upon a negative.

However if the negative is of the usual type, white on the kinescope screen will produce black on the negative and vice versa. While a recording method may be used in which white produces white and black produces black, it may be desirable to build into the receiver a circuit for black and white inversion which may change during the taking of the picture.

This black and white inversion may be accomplished by a phase inverting electronic device in the video circuit of the television receiver, after separation of the synchronizing signal. Such a device may use a single electronic tube, as a triode 103 with input terminals 104 and 105, the latter of which may be grounded. Input resistor 106 is connected across these input terminals to provide a conductive path, and the input terminals are connected into the video amplifier of the receiver. The plate is connected through resistor 107 to the positive end HV of a high voltage source, and the cathode is connected through a resistor 108 to the negative and grounded end. These resistors may be of equal value. The plate is also connected through capacitor 109 to a front contact 112 of the relay 69 and the cathode is also connected through capacitor 111 to the back contact 110. The armature 113 of the relay 69 which is normally held in contact with back contact 110 by means of a spring 114 is connected to the grid of a succeeding video amplifier 115 or the control grid of the kinescope, which may be conductively connected to ground by circuits not shown. In the normal position indicated, the signal at terminals 104, 105 passes through the device without phase inversion, and produces a normal picture on the kinescope screen. If however the switch 70 is closed, then during the operation of the camera 13 the relay 69 will be operated causing a phase reversal and causing otherwise bright parts of the screen to be dark and vice versa.

A standard television receiver usually has a master on-off switch such as 11 which must be turned on to powerize the receiver. The selector switch 51 refers only to power for the circuits referring to the camera only. If the receiver is desired to be set for the recording of a prescheduled picture, and the receiver is sufficiently stable in operation, it may be desirable and possible to leave the controls properly set but with the receiver depowerized until it is controlled by the time switch.

Moreover for any complete installation with a definite type of recorder and method of development, it may be desirable to make one or both of the picture changing relays 67 and 69 operative when the picture is taken manually and not when it is taken automatically.

The control of the television receiver both as to power and as to reversal of the image may then be simplified for the operator by making use of a selector switch with more blades and contacts. Thus assume the recording and the developing of the picture is based upon the use of a "Polaroid (Land) camera," which produces a picture corresponding to the subject as viewed from an eye positioned the same as the lens. Assume that for special pictures, there is mirror inversion at the transmitter, so that printed material will not be readable on the screen without use of a mirror such as is provided for the lens of the camera 13. Assume that there is no black and white inversion required, so that relay 69 and associated circuits are not required. Assume that it is desired to make the mirror inversion by use of relay 67 for a normally transmitted television picture, so that to the camera while recording it will appear similar to a special pre-inverted picture. Then the switching circuit in accordance with the present invention, using a single control selector switch, and assuming the switch 11 of Fig. 1 is omitted and replaced by a permanent connection, may be as in Fig. 2, wherein parts numbered corresponding to parts of Fig. 1 have like purposes.

In the modified form of Fig. 2, the television receiver 10, camera 13, controller 25, selector 38, interlock 63, and time switch 60 are designated in block, with terminals for various purposes as in Fig. 1. The inverter switch 68 in the television receiver 10 is shown closed for operation of the mirror inversion relay 67 but the relay 69 is omitted since black to white inversion is not required. A four point four section gang switch 116 is provided, with an index designating the four positions O, T, M, A which refer to off, television only, manual camera, automatic camera. The switch section 116*a* for controlling the inverter has its center connected to controller terminal 37 and one end of the winding of interlock actuator 65; its fourth contact connected through a resistor 117 to terminal 36, to the other end of the winding of the actuator 65, and to one end of the winding of relay switch 67; and its third contact connected through the closed switch 68 to the other end of the winding of relay 67. Power terminal 23 is connected to one input terminal of the time switch 60, and to terminal 21 of the television receiver and terminal 44 of the selector and to terminal 62 of the safety interlock 63 the other terminal 64 of which is connected to terminal 27 of the controller 25. Thus when the safety interlock is set to close the connection between terminals 62 to 64, the terminal 23 is connected to one of the power terminals of the television receiver, selector and controller. The other television receiver terminal 22 is connected to the center of switch section 116*b*, the other selector terminal 43 is connected to the center of switch section 116*c*, and the other controller terminal 26 is connected to the center of the switch section 116*d*. The other power supply terminal 24 is connected to switch points 2 and 3 of section 116*b*, and switch point 3 of section 116*d*, and to the other input terminal of the time switch 60, which when closed connects the terminal 24 to the fourth switch points of sections 116*b*, 116*c* and 116*d*. The resistor 117 is of resistance value equal to that of the winding of relay 67, to maintain equal load on the controller D. C. output regardless of the switch position used.

It will be evident that for the off position of the gang switch, none of the circuits, except the time switch, will be powerized. For the position T, when the operation of the television receiver only is desired, it will be powerized regardless of the operation of the time switch. For the position M when manual operation is desired, both the receiver and the camera controller will be powerized, providing the interlock has been reset after the previous camera operation, regardless of the operation of the time clock. For the position A, for automatic operation, the receiver, selector and controller (subject to the interlock) will be powerized only when the time switch is operative. Furthermore for switch position M but not for switch position A, the relay 67 will be operative during the operation of the camera when terminals 36 and 37 are powerized, so that when manual operation is desired, the picture is given an electrical mirror conversion to compensate for the mechanical inversion by the mirror associated with the camera.

Various other methods of control of the system may be worked out for a given set of conditions by those skilled in the art.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A system for recording a still picture from a television screen, comprising a television receiver having a screen on which the television image appears, a camera having means including a shutter to photograph said image onto a sensitized surface, shutter-actuating means, shutter operating means including a control circuit operatively connected to said shutter actuating means, means to renew said sensitized surface for receiving a subsequent photographic image, means rendering said shutter-actuating means inoperative after each actuation, and means responsive to actuation of said surface-renewing means to release said last means and thereby condition said shutter-actuating means for operation.

2. A system for recording a still picture from a television screen, comprising a television receiver having a screen on which the scanned television image appears, a camera having means including a shutter to photograph said image onto a sensitized surface, shutter-actuating means including a control circuit, means operatively connecting said shutter-actuating means to said shutter, electronic means operatively connected to invert the image on said television screen, and means actuating said electronic means prior to and during the actuating period of said shutter.

3. A system as set forth in claim 2 in which said electronic means comprises means for producing a mirror image inversion.

4. A system as set forth in claim 2 in which said electronic means comprises means for producing a dark and light inversion from positive to negative form.

5. A system for recording a still picture from a television screen, comprising a television receiver having a screen on which the television image appears, a camera having means including a shutter to photograph said image onto a sensitized surface, shutter-actuating means, shutter operating means including a control circuit operatively connected to said shutter actuating means, said television receiver including a cathode ray tube having two pairs of deflection elements, means reversing the connection of the elements of one pair for thereby inverting the image on said screen, and means actuating said last means only during the existence shutter-actuating periods.

6. A system for recording a still picture from a television screen, comprising a television receiver having a screen on which the television image appears, a camera having means including a shutter to photograph said image onto a sensitized surface, shutter-actuating means, shutter operating means including a control circuit operatively connected to said shutter actuating means, means whereby said control circuit is responsive to a given signal received by said television receiver, a second control circuit, locally controlled means connected to said second control circuit to actuate said shutter-actuating means, and relay means responsive to actuation of said second control circuit to produce image inversion on said screen.

References Cited in the file of this patent

UNITED STATES PATENTS

| | | |
|---|---|---|
| 1,978,684 | McCreary | Oct. 30, 1934 |
| 2,251,786 | Epstein | Aug. 5, 1941 |
| 2,294,809 | Smith | Sept. 1, 1942 |
| 2,373,114 | Goldsmith | Apr. 10, 1945 |
| 2,404,839 | Hammond | July 30, 1946 |
| 2,420,029 | Brady | May 6, 1947 |
| 2,429,921 | Brady | Oct. 28, 1947 |
| 2,504,734 | Schmidling | Apr. 18, 1950 |